United States Patent
Yamada

(10) Patent No.: US 9,912,479 B1
(45) Date of Patent: Mar. 6, 2018

(54) KEY ENCAPSULATION MECHANISMS

(71) Applicant: ISARA Corporation, Waterloo (CA)

(72) Inventor: Atsushi Yamada, Toronto (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/619,046

(22) Filed: Jun. 9, 2017

(51) Int. Cl.
| | |
|---|---|
| H04L 9/30 | (2006.01) |
| H03M 13/11 | (2006.01) |
| H04L 9/32 | (2006.01) |
| H04L 9/14 | (2006.01) |
| H04L 9/08 | (2006.01) |
| H04L 9/06 | (2006.01) |
| H04L 9/00 | (2006.01) |

(52) U.S. Cl.
CPC .......... *H04L 9/304* (2013.01); *H03M 13/116* (2013.01); *H03M 13/1174* (2013.01); *H04L 9/002* (2013.01); *H04L 9/0618* (2013.01); *H04L 9/0643* (2013.01); *H04L 9/0822* (2013.01); *H04L 9/0858* (2013.01); *H04L 9/14* (2013.01); *H04L 9/302* (2013.01); *H04L 9/3242* (2013.01)

(58) Field of Classification Search
CPC ....... H04L 9/304; H04L 9/3242; H04L 9/302; H04L 9/14; H04L 9/0858; H04L 9/0643; H04L 9/0618; H04L 9/0822; H04L 9/002; H03M 13/116; H03M 13/1174
See application file for complete search history.

(56) References Cited

U.S. PATENT DOCUMENTS

| 2015/0163060 | A1* | 6/2015 | Tomlinson | H04L 9/304 380/30 |
| 2016/0050067 | A1* | 2/2016 | Merchant | H04L 9/0838 713/171 |
| 2016/0112189 | A1* | 4/2016 | Tomaru | H04K 1/02 380/268 |
| 2016/0330023 | A1* | 11/2016 | Tanamoto | G06F 7/588 |
| 2017/0104590 | A1* | 4/2017 | Wang | H04L 9/304 |

OTHER PUBLICATIONS

Baldi, Marco et al., "Quasi-Cyclic Low-Density Parity-Check Codes in the McEliece Cryptosystem", IEEE 2007, pp. 951-956.*
Alkim, Erdem , et al., "Post-quantum key exchange—a new hope", Cryptology ePrint Archive: Report 2015/1092, Mar. 29, 2016, 21 pages.

(Continued)

*Primary Examiner* — Michael Pyzocha
(74) *Attorney, Agent, or Firm* — Henry Patent Law Firm PLLC

(57) ABSTRACT

In a general aspect, a key encapsulation mechanism is used in a communication network. In some aspects, an error vector derivation function is applied to a random value to produce an error vector, and a plaintext value is obtained based on the random value. The error vector and the plaintext value are used in an encryption function to produce a ciphertext, and a key derivation function (KDF) is applied to the random value to produce a key derivation function output that includes a symmetric key and a confirmation value. The symmetric key is used to generate an encrypted message based on an unencrypted message. The ciphertext, the confirmation value, and the encrypted message are provided for transmission in a communication network.

29 Claims, 5 Drawing Sheets

(56) References Cited

OTHER PUBLICATIONS

Bernstein, Daniel, et al., Post-Quantum Cryptography; Springer; ISBN: 978-3-540-88701-0, 2009, 248 pages.
Bernstein, Daniel, et al., "McBits: fast constant-time code-based cryptography", accessed at https://cryptojedi.org/papers/mcbits-20130616.pdf, Jun. 16, 2013, 26 pages.
Bernstein, Daniel, et al., "NTRU Prime", accessed at https://ntruprime.cr.yp.to/ntruprime-20160511.pdf, May 11, 2016, 34 pages.
Dent, Alexander, "A Designer's Guide to KEMs", Cryptology ePrint Archive: Report 2002/174, Oct. 31, 2005, 28 pages.
Galbraith, Steven, "On the Security of Supersingular Isogeny Cryptosystems", Cryptology ePrint Archive: Report 2016/859, Jan. 31, 2017, 21 pages.
Guo, Qian, "A Key Recovery Attack on MDPC with CCA Security Using Decoding Errors", Cryptology ePrint Archive: Report 2016/858, Sep. 8, 2016, 29 pages.
Howgrave-Graham, Nick, et al., "The Impact of Decryption Failures on the Security of NTRU Encryption", Advances in Cryptology—CRYPTO 2003, 23rd Annual International Cryptology Conference, Santa Barbara, California, USA (accessed at https://www.iacr.org/archive/crypto2003/27290225/27290225.ps), Aug. 2003.
Kobara, Kazukuni, et al., "Semantically Secure McEliece Public-Key Cryptosystems: Conversions for McEliece PKC", K. Kim (Ed.): PKC 2001, LNCS 1992, pp. 19-35, Springer (accessed at https://pdfs.semanticscholar.org/b2aa/b6300cf1f30490901b5bf5f8392996ac15e2.pdf), 2001.
Misoczki, Rafael, et al., "MDPC-McEliece: New McEliece Variants from Moderate Density Parity-Check Codes", Cryptology ePrint Archive: Report 2012/409, May 30, 2013, 22 pages.
Repka, Marek, et al., "Overview of the McEliece Cryptosystem and its Security", Tatra Mt. Math Publ 60, pp. 57-83 (accessed at https://www.sav.sk/journals/uploads/0212093505re-zaj.pdf), 2014, 27 pages.
Wikipedia, "Fisher-Yates shuffle", accessed at https://en.wikipedia.org/wiki/Fisher%E2%80%93Yates_shuffle on May 12, 2017, 2017, 9 pages.
Wikipedia, "S/MIME", accessed at https://en.wikipedia.org/wiki/S/MIME on May 12, 2017, 2017, 3 pages.
Design and Analysis of Practical Public-Key Encryption Schemes Secure against Adaptive Chosen Ciphertext Attack, Cramer, Shoup, 2003, http://www.shoup.net/papers/cca2.pdf, Aug. 14, 2003, 69 pgs.
"Secure/Multipurpose Internet Mail Extensions", https://en.wikipedia.org/wiki/S/MIME.
Alkim, Erdem, et al., "Post-quantum key exchange—a new hope", Cryptology ePrint Archive: Report 2015/1092, Dec. 7, 2015, 34 pages.
Barreto, et al., CAKE: Code-based Algorithm for Key Encapsulation, 2017, 20 pgs.

\* cited by examiner

KEY ENCAPSULATION MECHANISMS

BACKGROUND

The following description relates to key encapsulation mechanisms for cryptosystems.

Cryptography systems ("cryptosystems") are used to communicate securely over public channels. For example, cryptosystems may provide confidentiality by encrypting messages sent over the public channels. Public key encryption algorithms may utilize public and private cryptographic keys to encrypt and decrypt messages. Some public key cryptosystems may be vulnerable to attacks by an adversary, such as an adversary with access to quantum computational resources.

DETAILED DESCRIPTION

Figure 1:
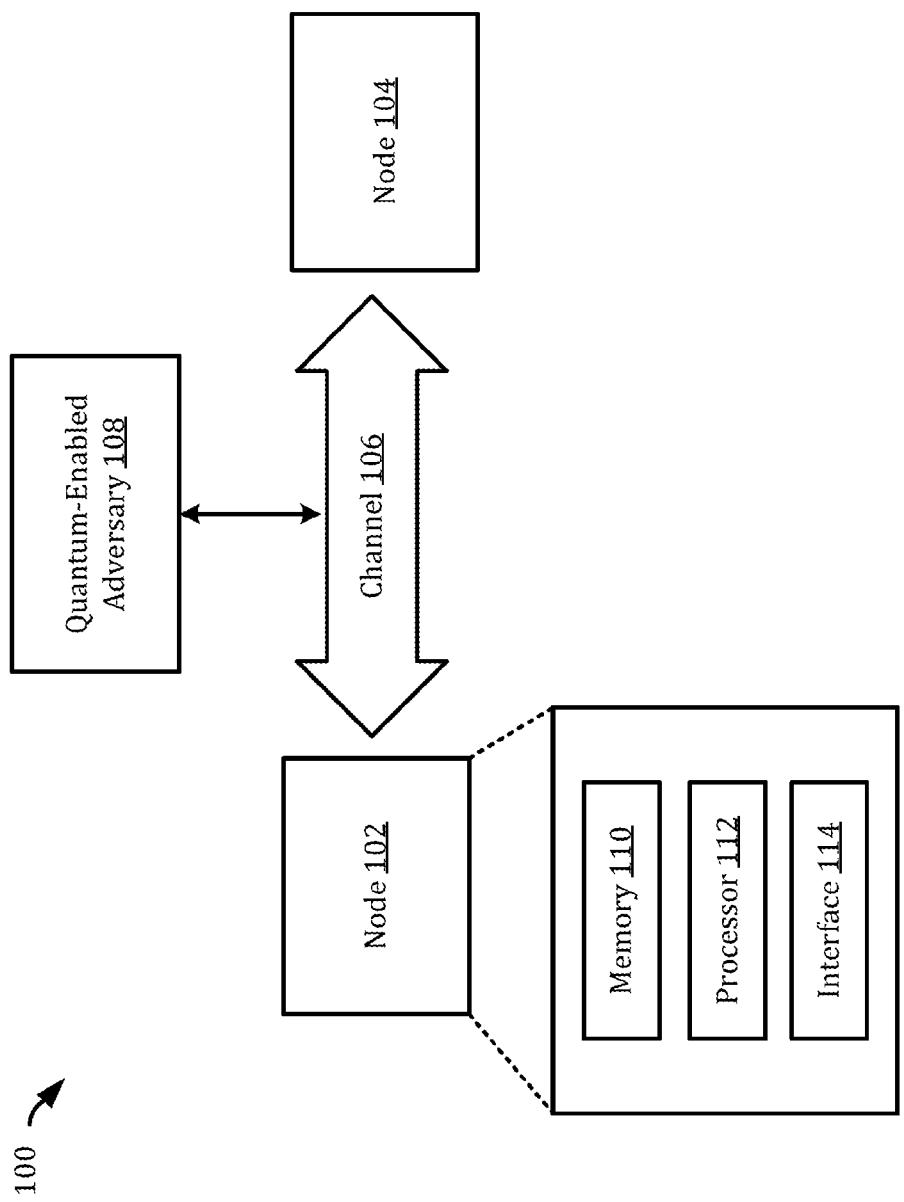
FIG. 1 is a block diagram showing aspects of an example communication system.

In aspects of what is described here, a key encapsulation mechanism (KEM) is used for cryptographic correspondence. For instance, in some examples, a KEM is used with a public key cryptosystem to encrypt electronic mail communications, such as, for example messages formatted according to the Secure/Multipurpose Internet Mail Extensions (S/MIME) standard, in one pass. The public key cryptosystem may be one based on error correction codes, such as, for example, the McEliece cryptosystem implemented using a Quasi-Cyclic Medium Density Parity Check (QC-MDPC) code.

For example, a sender of a message M may apply an error vector derivation function (including, for example, the application of a one-way pseudorandom function and a Fisher-Yates shuffle) to a random value s to produce an error vector e, and may obtain a plaintext value x based on the random value s. The sender may use the error vector e and the plaintext value x in a McEliece encryption function to produce a ciphertext $C_1$, and may also apply a key derivation function (KDF) to the random value s to produce a symmetric key K and a confirmation value $C_2$. The sender may use the symmetric key K to encrypt the message M. The encrypted version of the message M' may then be sent to a recipient along with the ciphertext $C_1$ and the confirmation value $C_2$.

After receipt of the ciphertext $C_1$, confirmation value $C_2$, and the encrypted message M', the recipient may apply a McEliece decryption function to the ciphertext $C_1$ to produce the plaintext value x and the error vector e. The recipient may then obtain a seed value s' based on the plaintext value x, apply a KDF to the seed value s' to produce a symmetric key K' and a confirmation check value $C_2'$, and apply the error vector derivation function to the seed value s' to produce an error vector check value e'. The recipient may then compare the error vector e with the error vector check value e' and compare the confirmation value $C_2$ with the confirmation check value $C_2'$. If both comparisons result in matches (e.g., the values in the respective comparisons are equal), the recipient may then use the symmetric key K' to decrypt the encrypted message M'.

Aspects of the present disclosure may provide one or more advantages in some instances. For example, some aspects may provide communications (e.g., electronic mail communications formatted according to the Secure/Multipurpose Internet Mail Extensions (S/MIME) standard) over a public channel that are secure against adversaries equipped with classical or quantum computational resources. The communications may be secured, in some aspects, using a one pass protocol using a static key pair. In some instances, the public key used to secure the communications may be small compared to other public key cryptosystem implementations (e.g., the McEliece cryptosystem implemented using a Goppa code), and even other public key cryptosystem implementations with a KEM (e.g., the McBits implementation of the Goppa code-based Niederreiter cryptosystem). For instance, in some implementations, the public key may be approximately 4 kilobytes (kB) whereas the public key in a McBits implementation may be approximately 1 Megabytes (MB). In addition, in some aspects, a key pair for the public key cryptosystem may be used repeatedly without jeopardizing security. Some aspects may provide secure communications that are resistant to key recovery attacks, the Adaptive Chosen Ciphertext Attack (CCA2), or both. Further, some aspects may provide secure communications that are CCA2 resistant without performing a CCA2 conversion technique, such as the Kobara-Imai CCA2 conversion. The communications may thus be encrypted, in some cases, using less computational resources than public key cryptosystem implementations using CCA2 conversions (e.g., the McEliece cryptosystem implemented with a Kobara-Imai CCA2 conversion, which can take up to approximately 80% of the overall time needed for encrypting messages). In some instances, side channel attacks may be mitigated better than public key cryptosystems that utilize CCA2 conversions. Some aspects may provide secure communications as described above, while also masking the random value used in the KEM such that an attacker cannot see any part of the random value. The use of a one-way error vector derivation function as described herein may also allow for verification that the error vector is generated in a pseudorandom manner. Aspects of the present disclosure may provide other advantages as well.

FIG. 1 is a block diagram showing aspects of an example communication system 100. The example communication system 100 shown in FIG. 1 includes two nodes 102, 104. The nodes use a cryptographic scheme to communicate with each other over a channel 106. In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 112, and an interface 114. Each of the nodes 102, 104 may include the same, additional or different components. The nodes 102, 104 may be configured to operate as shown and described with respect to FIG. 1 or in another manner.

The example memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in one or both of FIGS. 4 and 5.

Instructions (e.g., computer code, a computer program, etc.) associated with an operating system, computer applications, or other resources may be stored in the memory 110. In addition, the memory 110 can also store application data and data objects that can be interpreted by one or more applications or virtual machines running on the node 102. The node 102 can be preprogrammed, or it can be programmed (and reprogrammed), by loading a program from another source (e.g., from a removable memory device, from a remote server, from a data network, or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in FIGS. 4 and 5, as described further below.

In the example node 102 shown in FIG. 1, the processor 112 is a data processing apparatus that can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in FIGS. 4 and 5, as described further below.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes (e.g., via channel 106). In some cases, the interface 114 includes a wireless communication interface that provides wireless communication using various wireless protocols or standards. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptosystems are known to be insecure against an attacker armed with a scalable quantum computer. The threat of quantum computers to public key cryptography can be mitigated by switching to other public key cryptosystems that are believed to be invulnerable to quantum attack. For example, certain code-based signature schemes (e.g., the McEliece cryptosystem) have been proposed as quantum-resistant replacements for certain RSA-based or ECC-based cryptosystems that are believed to be quantum-vulnerable.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptosystems (e.g., by computing a private key of a certificate authority or other entity based on public information).

The example quantum-enabled adversary 108 shown in FIG. 1 can access information exchanged on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptosystems. For example, the quantum-enabled adversary 108 may be capable of computing prime factors fast enough to compromise certain RSA-based cryptosystems or computing discrete logarithms fast enough to compromise certain ECC-based cryptosystems.

In the example shown in FIG. 1, the nodes 102, 104 may use a quantum-resistant cryptosystem that cannot be compromised by the example quantum-enabled adversary 108. For instance, the nodes 102, 104 may communicate using a cryptosystem that is secure against a quantum computer that can efficiently execute Shor's algorithm or other types of algorithms that are known to compromise the security of certain conventional cryptography standards. In some implementations, for example, the nodes 102, 104 communicate using a McEliece cryptosystem implemented using a Quasi-Cyclic Medium Density Parity Check (QC-MDPC) code. The nodes 102, 104 may use a key encapsulation mechanism (KEM) to provide additional security against certain known attacks by adversaries. For example, in some implementations, a KEM can be used with the McEliece cryptosystem implemented using a QC-MDPC code to provide security against key recovery attacks and the Adaptive Chosen Ciphertext Attack (CCA2). In some implementations, the nodes 102, 104 execute secure communication over the channel 106 using the example techniques provided in FIG. 2, 3, 4 or 5 or using other techniques.

Figure 2:
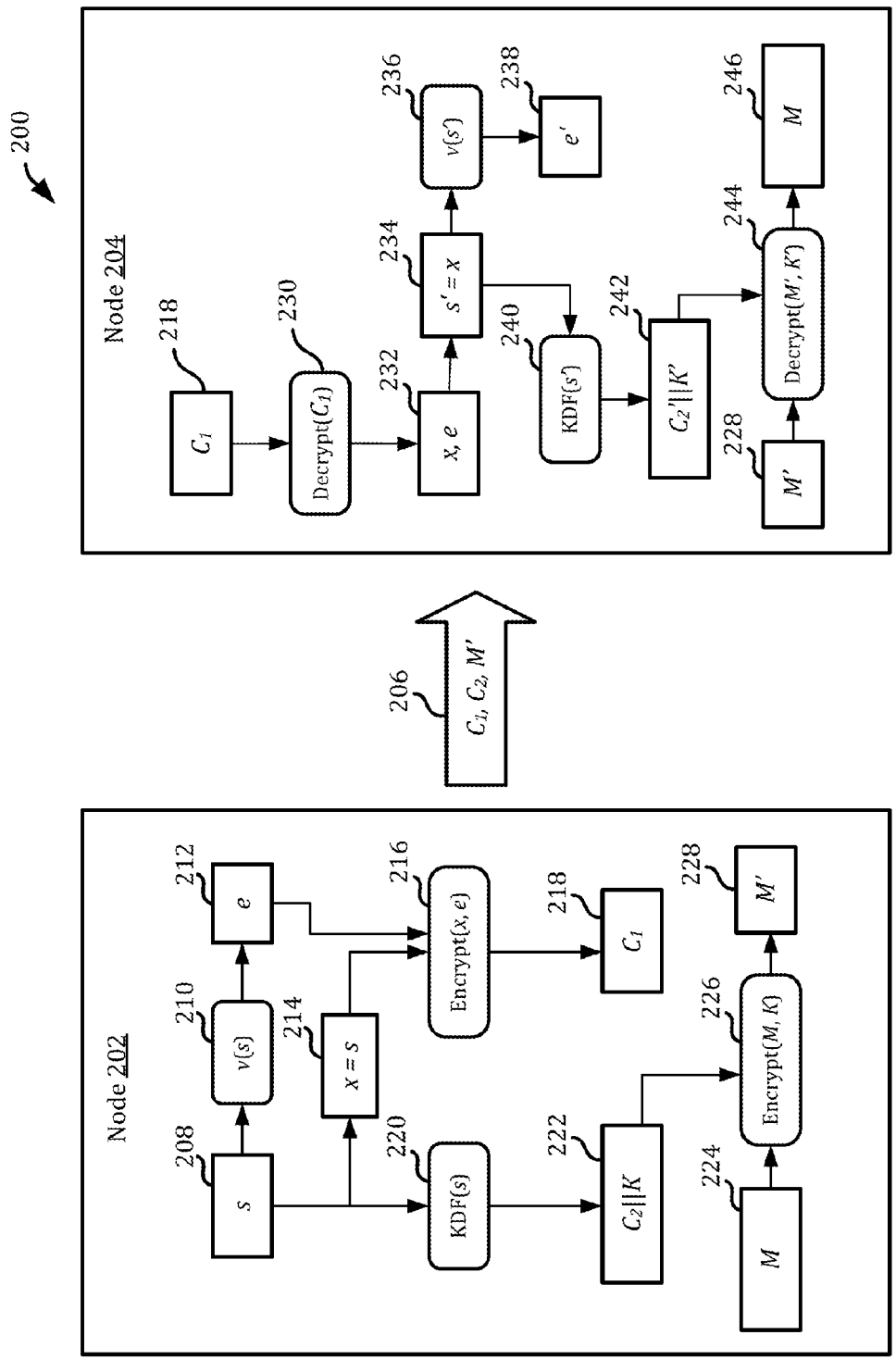
FIG. 2 is a block diagram showing aspects of an example key encapsulation mechanism (KEM).

FIG. 2 is a block diagram showing aspects of an example key encapsulation mechanism (KEM). In the example shown, a communication system 200 includes nodes 202 and 204 communicating over a channel 206. The nodes 202, 204 may be implemented similar to the nodes 102, 104 of FIG. 1. For instance, the nodes 202, 204 may each have computational resources (e.g., hardware, software, firmware) that are used to communicate with other nodes in the communication system 200, and may include a memory, processor, and interface as described above with respect to node 102 of FIG. 1. The nodes 202, 204 can be implemented in various systems, such as, for example, laptops, desktops, workstations, smartphones, tablets, personal digital assistants, servers, server clusters, mainframes, and other types of computer systems.

In the example shown in FIG. 2, the nodes 202, 204 exchange encrypted communications over the channel 206. The encrypted communications may be secure, in some instances, against both classical- and quantum-enabled adversaries (e.g., the quantum adversary 108 of FIG. 1). For instance, in some implementations, the node 202 uses a KEM with a McEliece cryptosystem implemented using a Quasi-Cyclic Medium Density Parity Check (QC-MDPC) code C of (n, k, t), where n is the size of a code word, k is the size of a message (plaintext), and t is the Hamming weight of an error vector. By using a KEM as shown in FIG. 2, the communications exchanged over the channel 206 may be secure against the known key recovery attack as well as the Adaptive Chosen Ciphertext Attack (CCA2) without the need for CCA2 conversion techniques (e.g., the Kobara-Imai CCA2 conversion technique).

In the example shown in FIG. 2, the node 202 obtains a random value 208 ($s$), which may be generated using a random number generator or in another manner. In some implementations, the random value 208 is a k-bit value. The example node 202 then applies an error vector derivation function 210 ($v(\cdot)$) to the random value 208 to produce an error vector 212 ($e$). In some implementations, the error vector derivation function 210 is a one-way (non-invertible) function that generates an n-bit error vector 212 (an n-dimensional vector of bits) in a pseudorandom manner. For example, the error vector derivation function 210 may apply a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the random value and apply a filter (e.g., a Fisher-Yates shuffle) to the pseudorandom function output to produce a set of t integers ($a_1, a_2, \ldots, a_n$), where each integer is in the range $1 \leq a_i \leq n$ for $a_i \neq a_j$ for $i \neq j$. The set of t integers can then be used to generate the error vector. For example, the error vector may have a Hamming weight equal to t, where the $a_i$-th element of the error vector is set to one (1) and the other elements are set to zero (0).

The node 202 also obtains a plaintext value 214 ($x$) based on the random value 208. In the example shown, the node 202 obtains the plaintext value 214 by assigning the random value 208 as the plaintext value 214 (e.g., by setting the plaintext value 214 equal to the random value 208). The plaintext value 214 and the error vector 212 are then used in an encryption function 216 to produce a ciphertext 218 ($C_1$). In some implementations, the encryption function 216 is a McEliece encryption function implemented according to a McEliece cryptosystem using the QC-MDPC code. For instance, the QC-MDPC code may generate a public key G and private key H, where G is a k×n code generator matrix and H is a (n−k)×n parity check matrix for G. In some implementations, the private key matrix H may be computed first, and the public key matrix G may be derived from H. The encryption function 216 may use the public key matrix G to generate the ciphertext 218, for example, according to the equation $C_1=xG+e$, where $C_1$ is the ciphertext 218, x is the plaintext value 214, G is the public key matrix for the McEliece cryptosystem, and e is the error vector 212.

The node 202 also applies a key derivation function (KDF) 220 to the random value 208. In some implementations, the KDF 220 includes a cryptographic hash function (e.g., SHA2). The KDF 220 produces an output 222 that includes a concatenation of a symmetric key (K) and a confirmation value ($C_2$). In some implementations, the symmetric key includes a specified number of the least significant bits of the KDF output 222, and the confirmation value includes the remaining bits of the KDF output 222. The symmetric key is then used in an encryption function 226 to generate an encrypted message 228 based on a message 224. In some implementations, the encryption function 226 is implemented according to symmetric cipher system, such as, for example, an Advanced Encryption Standard (AES) cryptosystem. In some implementations, the message 224 that is encrypted by the encryption function 226 is an electronic mail message (e.g., a message formatted according to the Secure/Multipurpose Internet Mail Extensions (S/MIME) standard) or another type of message (e.g., an instant messaging service such as IMESSAGE or SIGNAL). The node 202 then transmits the ciphertext 218, the confirmation value of the KDF output 222, and the encrypted message 228 to the node 204 over the channel 206.

In the example shown in FIG. 2, after receiving the ciphertext 218, the confirmation value of the KDF output 222, and the encrypted message 228, the node 204 begins the key decapsulation process by applying a decryption function 230 to the ciphertext 218. The decryption function 230 may be the inverse of the encryption function 216. In some implementations, the decryption function 230 is a McEliece decryption function implemented according to a McEliece cryptosystem using the QC-MDPC code. For instance, the private key matrix H discussed above may be used to decrypt the ciphertext, for example, by applying a QC-MDPC decoding algorithm equipped with knowledge of H. The decryption function 230 produces an output 232 that includes the plaintext value (x) and the error vector (e). The node 204 then obtains a seed value 234 (s') based on the plaintext value (x). In the example shown, the seed value 234 is obtained by assigning the plaintext value from the decryption function output 232 as the seed value 234 (e.g., by setting the seed value 234 equal to the plaintext value from the decryption function output 232).

The example node 204 then applies an error vector derivation function 236 (v(•)) to the seed value 234 to produce an error vector check value 238 (e'). In the example shown, the error vector derivation function 236 is the same as error vector derivation function 210. The node 204 also applies a KDF 240 to the seed value 234. The KDF 240 produces an output 242 that includes a concatenation of the symmetric key (K') and a confirmation check value ($C_2$'). In some implementations, the symmetric key includes a specified number of the least significant bits of the KDF output 242, and the confirmation check value includes the remaining bits of the KDF output 242. The node 204 compares the error vector check value 238 with the error vector of the decryption function output 232, and compares the confirmation check value of the KDF output 242 with the confirmation value received from the node 202. If the error vector check value is equal to the error vector (if e=e') and the confirmation check value is equal to the confirmation value (if $C_2=C_2$'), the node 204 uses the symmetric key (K') to decrypt the encrypted message 228 received from the node 202 and to generate the decrypted message 246 (which is the same as the unencrypted message 224).

Figure 3:
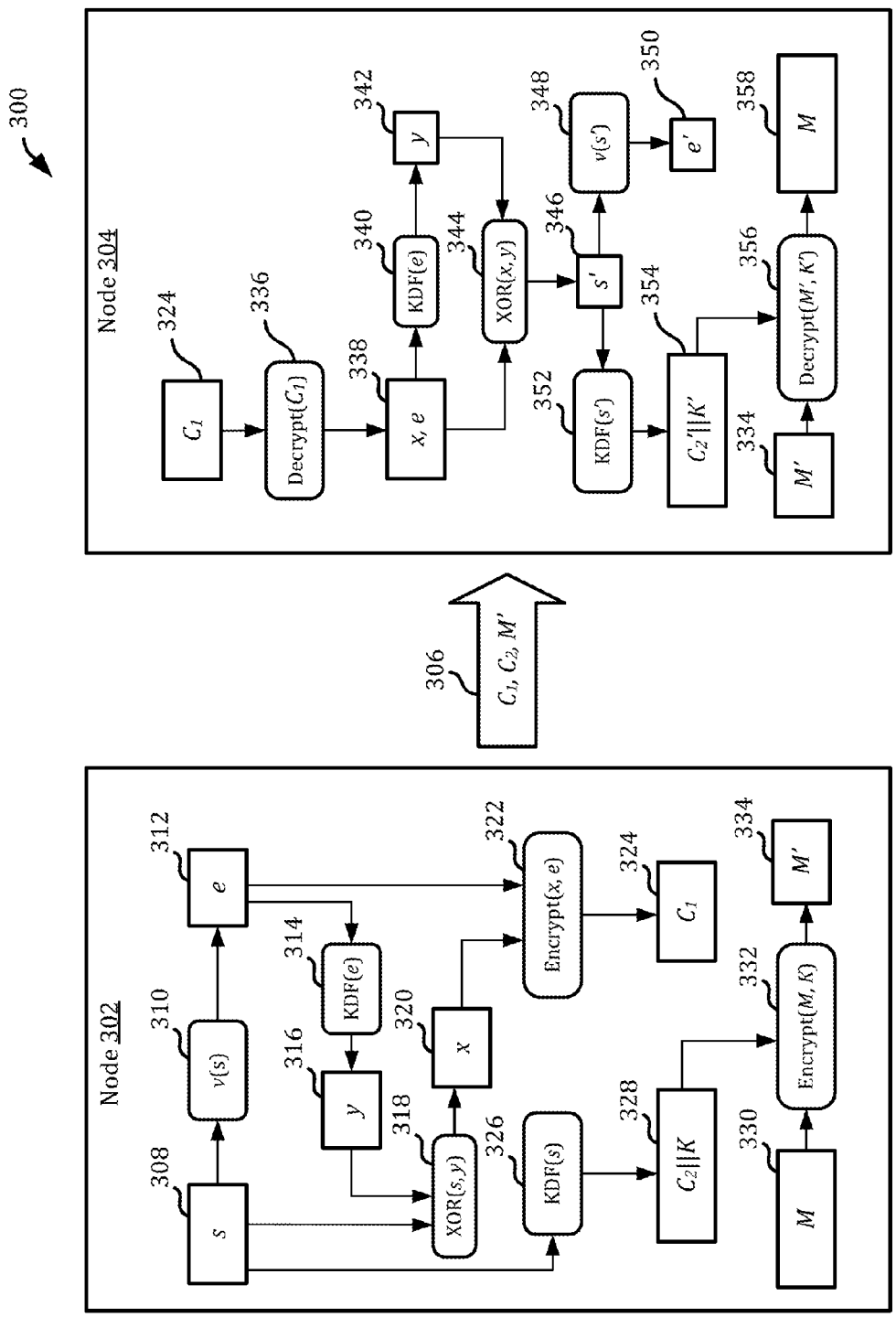
FIG. 3 is a block diagram showing aspects of another example key encapsulation mechanism (KEM).

FIG. 3 is a block diagram showing aspects of another example key encapsulation mechanism (KEM). In the example shown, a communication system 300 includes nodes 302 and 304 communicating over a channel 306. The nodes 302, 304 may be implemented similar to the nodes 102, 104 of FIG. 1. For instance, the nodes 302, 304 may each have computational resources (e.g., hardware, software, firmware) that are used to communicate with other nodes in the communication system 300, and may include a memory, processor, and interface as described above with respect to node 102 of FIG. 1. The nodes 302, 304 can be implemented in various systems, such as, for example, laptops, desktops, workstations, smartphones, tablets, personal digital assistants, servers, server clusters, mainframes, and other types of computer systems.

In the example shown in FIG. 3, the nodes 302, 304 exchange encrypted communications over the channel 306. The encrypted communications may be secure, in some instances, against both classical- and quantum-enabled adversaries (e.g., the quantum adversary 108 of FIG. 1). For instance, in some implementations, the node 302 uses a KEM with a McEliece cryptosystem implemented using a Quasi-Cyclic Medium Density Parity Check (QC-MDPC) code C of (n, k, t), where n is the size of a code word, k is the size of a message (plaintext), and t is the Hamming weight of an error vector. By using a KEM for a public key cryptosystem as shown in FIG. 3, the communications exchanged over the channel 306 may be secure against the known key recovery attack as well as the Adaptive Chosen Ciphertext Attack (CCA2) without the need for CCA2 conversion techniques (e.g., the Kobara-Imai CCA2 conversion technique).

In the example shown in FIG. 3, the node 302 obtains a random value 308 (s), which may be generated using a random number generator. In some implementations, the random value 308 is a k-bit value. The example node 302 then applies an error vector derivation function 310 (v(•)) to the random value 308 to produce an error vector 312 (e). In some implementations, the error vector derivation function 310 is a one-way (non-invertible) function that generates an n-bit error vector 312 (an n-dimensional vector of bits) in a pseudorandom manner. For example, the error vector derivation function 310 may apply a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the random value, and apply a filter (e.g., a Fisher-Yates shuffle) to the pseudorandom function output to produce a set of t integers ($a_1, a_2, \ldots, a_n$), where each integer is in the range $1 \leq a_i \leq n$ for $a_i \neq a_j$ for $i \neq j$. The set of t integers can then be used to generate the error vector. For example, the error vector may have a Hamming weight equal to t, where the $a_i$-th element of the error vector is set to one (1) and the other elements are set to zero (0).

The example node 302 also obtains a plaintext value 320 (x) based on the random value 308. In the example shown in FIG. 3, the node 302 obtains the plaintext value 320 by applying a key derivation function (KDF) 314 to the error vector 312 to produce a masking value 316 ($y$), and then applying an exclusive-or (XOR) function 318 to the random value 308 and the masking value 316 to produce the plaintext value 320. In some implementations, the KDF 314 includes a cryptographic hash function (e.g., a SHA2, SHA3, or SHAKE function). The KDF 314 may be a mask generation function (MGF) in some instances.

The plaintext value 320 and the error vector 312 are used in an encryption function 322 to produce a ciphertext 324 ($C_1$). In some implementations, the encryption function 322 is a McEliece encryption function implemented according to a McEliece cryptosystem using the QC-MDPC code. For instance, the QC-MDPC code may generate a public key G and private key H, where G is a k×n code generator matrix and H is a (n−k)×n parity check matrix for G. In some instances, the private key matrix H may be computed first, and the public key matrix G may be derived from H. The encryption function 322 may use the public key matrix G to generate the ciphertext 324, for example, according to the equation $C_1=xG+e$, where $C_1$ is the ciphertext 324, x is the plaintext value 320, G is the public key matrix for the McEliece cryptosystem, and e is the error vector 312.

The example node 302 also applies a KDF 326 to the random value 308. In some implementations, the KDF 326 includes a cryptographic hash function (e.g., a SHA2, SHA3, or SHAKE function). The KDF 326 may be the same as the KDF 314, or may be different from the KDF 314. The KDF 326 produces an output 328 that includes a concatenation of a symmetric key (K) and a confirmation value ($C_2$). In some implementations, the symmetric key includes a specified number of the least significant bits of the KDF output 328, and the confirmation value includes the remaining bits of the KDF output 328. The symmetric key of the KDF output 328 is then used in an encryption function 332 to generate an encrypted message 334 based a message 330. In some implementations, the encryption function 332 is implemented according to symmetric cipher system, such as, for example, an Advanced Encryption Standard (AES) cryptosystem. In some implementations, the message 330 that is encrypted by the encryption function 332 is an electronic mail message (e.g., a message formatted according to the Secure/Multipurpose Internet Mail Extensions (S/MIME) standard) or another type of message (e.g., a Short Message Service (SMS) message). The node 302 then transmits the ciphertext 324, the confirmation value of the KDF output 328, and the encrypted message 334 to the node 304 over the channel 306.

In the example shown in FIG. 3, after receiving the ciphertext 324, the confirmation value of the KDF output 328, and the encrypted message 334, the node 304 begins a key decapsulation process by applying a decryption function 336 to the ciphertext 324. The decryption function 336 may be the inverse of the encryption function 322. In some implementations, the decryption function 336 is a McEliece decryption function implemented according to a McEliece cryptosystem using the QC-MDPC code. For instance, the private key matrix H discussed above may be used to decrypt the ciphertext 324, for example, by applying a QC-MDPC decoding algorithm equipped with knowledge of H. The decryption function 336 produces an output 338 that includes the plaintext value (x) and the error vector (e). The node 304 then obtains a seed value 346 (s') based on the plaintext value (x) of the decryption function output 338. In the example shown, the seed value 346 is obtained by applying a KDF 340 to the error vector of the decryption function output 338 to produce a masking value 342 ($y$), and then applying an exclusive-or (XOR) function 344 to the masking value 342 and the plaintext value of the decryption output 338 to produce the seed value 346. In some implementations, the KDF 340 includes a cryptographic hash function (e.g., a SHA2, SHA3, or SHAKE function). The KDF 340 may be a mask generation function (MGF) in some instances.

The example node 304 then applies an error vector derivation function 348 (v(•)) to the seed value 346 to produce an error vector check value 350 (e'). In the example shown, the error vector derivation function 348 is the same as error vector derivation function 310. The node 304 also applies a KDF 352 to the seed value 346. The KDF 352 produces an output 354 that includes a concatenation of a symmetric key (K') and a confirmation check value ($C_2$'). In some implementations, the symmetric key includes a specified number of the least significant bits of the KDF output 354, and the confirmation check value includes the remaining bits of the KDF output 354. The node 304 compares the error vector check value 350 with the error vector of the decryption function output 338, and compares the confirmation check value of the KDF output 354 with the confirmation value received from the node 302. If the error vector check value is equal to the error vector (if e=e') and the confirmation check value is equal to the confirmation value (if $C_2=C_2$'), the node 304 uses the symmetric key (K') from the KDF output 354 to decrypt the encrypted message 334 received from the node 302 and generate the decrypted message 358 (which is the same as the unencrypted message 330).

Figure 4:
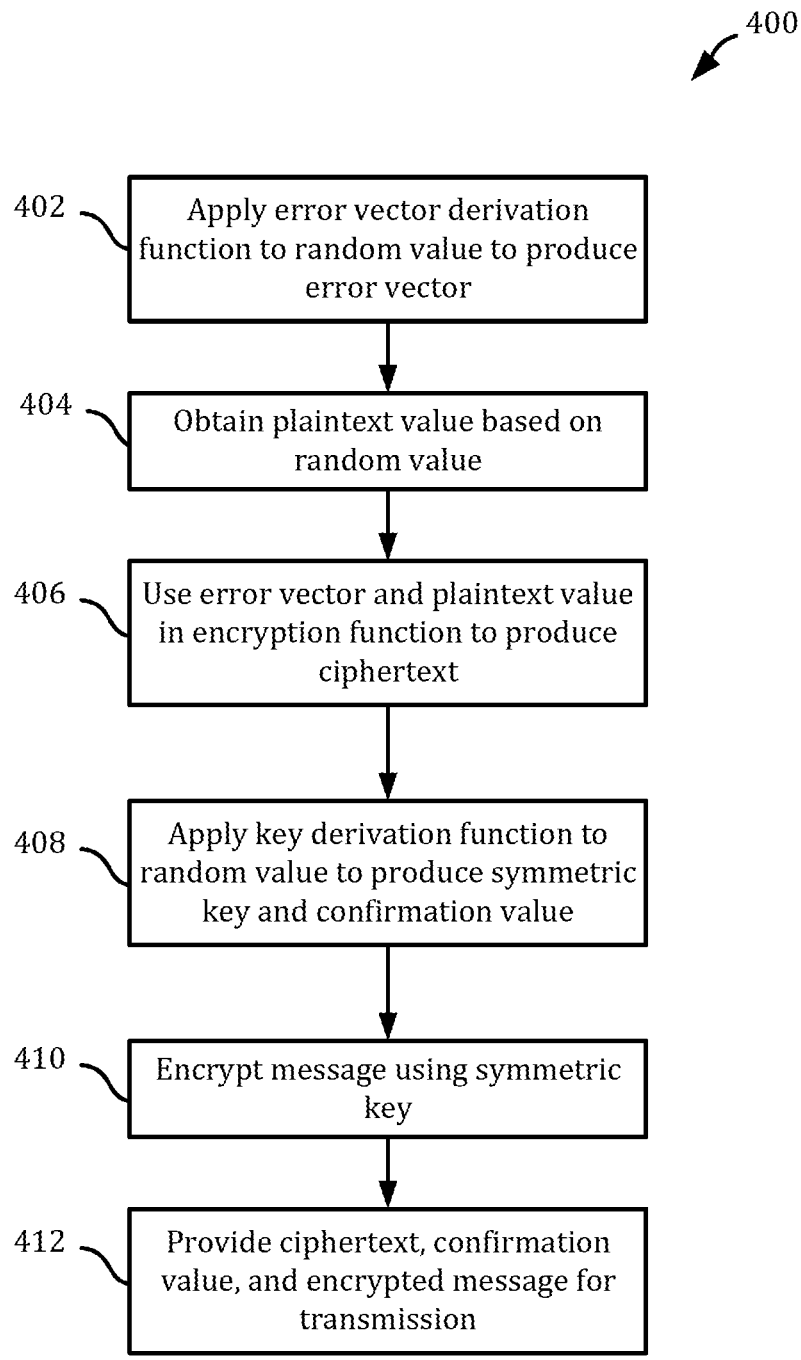
FIG. 4 is a flow diagram showing an example key encapsulation process.

FIG. 4 is a flow diagram showing an example key encapsulation process 400. The example process 400 can be performed, for example, by computer systems that can exchange information over a communication channel. For instance, operations in the process 400 may be performed by the nodes 102, 104 in the example communication system 100 shown in FIG. 1, the nodes 202, 204 in the example communication system 200 shown in FIG. 2, the nodes 302, 304 in the example communication system 300 shown in FIG. 3, or in another type of system. The example process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in parallel, iterated or otherwise repeated or performed in another manner. In some examples, the process 400 is secure against quantum-enabled adversaries such as, for example, the quantum-enabled adversary 108 shown in FIG. 1. The example process 400 may also provide security against classically-enabled adversaries who do not have access to quantum computers or other quantum resources.

At 402, an error vector derivation function is applied to a random value s to produce an error vector e. The random value s may be a value comprising a string of k bits, and may be obtained from a random number generator, retrieved from memory, or obtained in another manner. The error vector derivation function v(•) may be a one-way function that generates an n-bit error vector e (an n-dimensional vector of bits) using a pseudorandom function and a filter. In some implementations, the error vector derivation function applies a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the random value and applies a filter (e.g., a Fisher-Yates shuffle) to the pseudorandom function output to produce a set of t integers ($a_1, a_2, \ldots, a_n$), where each integer is in the range $1 \le a_i \le n$ for $a_i \ne a_j$ for $i \ne j$. The set of t integers can then be used to generate the error vector e. For example, the error vector e may have a Hamming weight equal to t, where the $a_i$-th element of the error vector is set to one (1) and the other elements are set to zero (0).

At 404, a plaintext value x is obtained based on the random value s. In some implementations, the random value s is assigned to the plaintext value x. For example, referring to the example shown in FIG. 2, the plaintext value 214 is set equal to the random value 208. In some implementations, a k-bit masking value y is generated by applying a key derivation function (KDF) to the error vector e, and then applying an exclusive-or (XOR) function to the masking value y and the random value s to produce the plaintext value x. For example, referring to FIG. 3, the plaintext value 320 is obtained from the random value 308 by applying the KDF 314 to produce the masking value 316 and then applying the exclusive-or (XOR) function 318 to the masking value 316 and the random value 308. In some implementations, the KDF is a cryptographic hash function. For example, the KDF may be a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function), or another type of cryptographic hash function (e.g., a SHA2 function).

At 406, the error vector e and the plaintext value x are used in an encryption function to produce a ciphertext $C_1$. The encryption function may use a public key to produce the ciphertext based on the plaintext value x and the error vector e. In some implementations, the encryption function is a McEliece encryption function, and the plaintext value x is encrypted according to a McEliece cryptosystem using the error vector e and a public key G. For example, the encryption function may be implemented according to a McEliece cryptosystem using a QC-MDPC code, and the ciphertext $C_1$ may be generated by adding the error vector e to the product of the plaintext value x and a public key matrix G ($C_1 = xG + e$), as discussed above with respect to FIGS. 2 and 3. The public key may be based on a private key known to a recipient node in some instances. For example, referring to the example shown in FIG. 3, the public key used in the encryption function 322 may be a public key matrix G based on a private key matrix H known to the node 304.

At 408, a key derivation function (KDF) is applied to the random value s to produce a symmetric key K and a confirmation value $C_2$. In some implementations, the KDF includes a cryptographic hash function. For example, the key derivation function may include a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function), or another type of cryptographic hash function (e.g., a SHA2 function). In some implementations, the KDF outputs a concatenation of the symmetric key K and the confirmation value $C_2$. In some implementations, the KDF is applied to a concatenation of the random value s and the error vector e (s∥e) to produce a concatenation of the symmetric key K and the confirmation value $C_2$ ($C_2$∥K).

At 410, a message is encrypted using the symmetric key. In some implementations, the encryption is performed using a symmetric cipher system, such as, for example, an Advanced Encryption Standard (AES) cryptosystem. The encryption function may generate an encrypted message M'.

At 412, the ciphertext $C_1$, the confirmation value $C_2$, and the encrypted message M' are provided for transmission in a communication network. In some implementations, the ciphertext $C_1$, the confirmation value $C_2$, and the encrypted message M' are provided to an interface of the node or nodes performing the process 400 such that the node(s) may transmit the information to another node in the communication network. For instance, referring to the example shown in FIG. 3, the ciphertext 324, the confirmation value of the KDF output 328, and the encrypted message 334 may be provided to a network interface of the node 302 for transmission to the node 304 over the channel 306.

Figure 5:
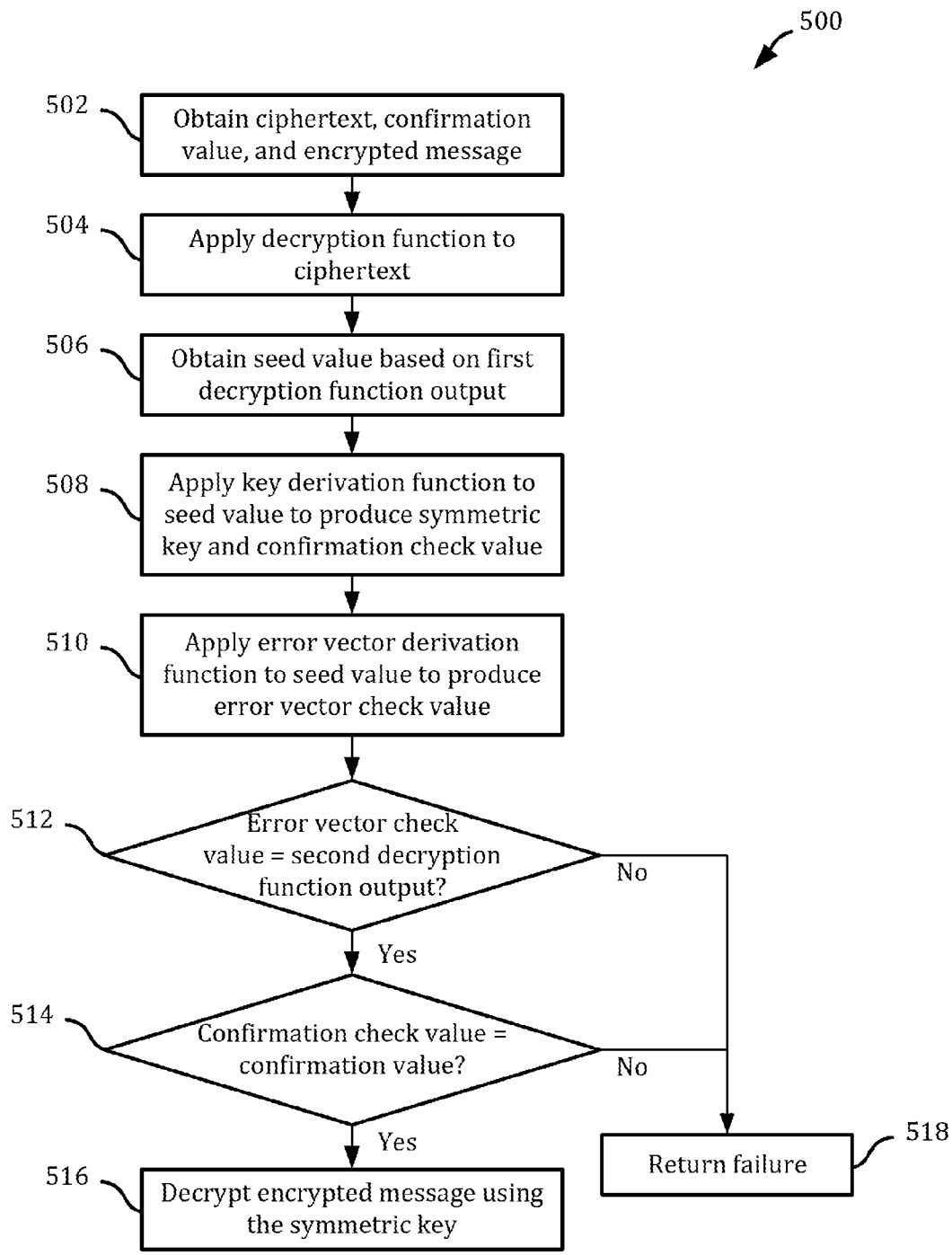
FIG. 5 is a flow diagram showing an example key decapsulation process.

FIG. 5 is a flow diagram showing an example key decapsulation process 500. The example process 500 can be performed, for example, by computer systems that can exchange information over a communication channel. For instance, operations in the process 500 may be performed by the nodes 102, 104 in the example communication system 100 shown in FIG. 1, the nodes 202, 204 in the example communication system 200 shown in FIG. 2, the nodes 302, 304 in the example communication system 300 shown in FIG. 3, or in another type of system. The example process 500 may include additional or different operations, and the operations may be performed in the order shown or in another order. In some cases, one or more of the operations shown in FIG. 5 are implemented as processes that include multiple operations, sub-processes or other types of routines. In some cases, operations can be combined, performed in parallel, iterated or otherwise repeated or performed in another manner. In some examples, the process 500 is secure against quantum-enabled adversaries such as, for example, the quantum-enabled adversary 108 shown in FIG. 1. The example process 500 may also provide security against classically-enabled adversaries who do not have access to quantum computers or other quantum resources.

At 502, a ciphertext $C_1$, a confirmation value $C_2$, and an encrypted message M' are obtained. In some implementations, the ciphertext $C_1$, the confirmation value $C_2$, and the encrypted message M' are obtained from an interface of a node in a communication network after the interface has received the information from another node in the communication network. For instance, referring to the example shown in FIG. 3, the ciphertext 324, the confirmation value from the KDF output 328, and the encrypted message 334 may be obtained from a network interface of the node 304 after the information has been received from the node 302. In some implementations, the ciphertext $C_1$, a confirmation value $C_2$, and an encrypted message M' are retrieved from memory.

At 504, a decryption function is applied to the ciphertext $C_1$ obtained at 502. The decryption function may be the inverse of an encryption function used by another node in the communication network to obtain the ciphertext $C_1$. Thus, the output of the decryption function may include the plaintext value x and the error vector e. In some implementations, the decryption function is a McEliece decryption function, and the ciphertext $C_1$ is decrypted using a private key. For example, the decryption function may be implemented according to a McEliece cryptosystem using a QC-MDPC code, and the ciphertext $C_1$ may be decrypted using a private key matrix H, as discussed above with respect to FIGS. 2 and 3.

At 506, a seed value s' is obtained based on the plaintext value x output from the decryption function. In some implementations, the plaintext value x is assigned to the seed value s'. For example, referring to the example shown in FIG. 2, the seed value 234 is set equal to the plaintext value of the decryption function output 230. In some implementations, a k-bit masking value y is generated by applying a key derivation function (KDF) to the error vector e obtained from the decryption function at 504, and then applying an exclusive-or (XOR) function to the masking value y and the plaintext value x to produce the seed value s'. For example, referring to the example shown in FIG. 3, the seed value 346 is obtained by applying the KDF 340 to the error vector of the decryption function output 338 to produce the masking value 342, and applying the exclusive-or (XOR) function 344 to the masking value 342 and the plaintext value of the decryption function output 338. In some implementations, the KDF is a cryptographic hash function. For example, the key derivation function may be a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function), or another type of cryptographic hash function (e.g., a SHA2 function).

At 508, a key derivation function (KDF) is applied to the seed value s' obtained at 506 to produce a symmetric key K' and a confirmation check value $C_2'$. In some implementations, the KDF includes a cryptographic hash function. For example, the KDF may include a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function), or another type of cryptographic hash function (e.g., a SHA2 function). In some implementations, the KDF outputs a concatenation of the symmetric key K' and the confirmation check value $C_2'$. In some implementations, the KDF is applied to a concatenation of the seed value s' and the error vector e (obtained at 506) to produce a concatenation of the symmetric key K' and the confirmation check value $C_2'$.

At 510, an error vector derivation function is applied to the seed value s' obtained at 506 to produce an error vector check value e'. The error vector derivation function v(•) may be a one-way function that generates an n-dimensional error vector check value e' of bits using a pseudorandom function and a filter. In some implementations, the error vector derivation function applies a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the random value and applies a filter (e.g., a Fisher-Yates shuffle) to the pseudorandom function output to produce a set of t integers ($a_1$, $a_2$, ..., $a_n$), where each integer is in the range $1 \leq a_i \leq n$ for $a_i \neq a_j$ for $i \neq j$. The set of t integers can then be used to generate the error vector check value e'. For example, the error vector check value e' may have a Hamming weight equal to t, where the $a_i$-th element of the error vector is set to one (1) and the other elements are set to zero (0).

At 512, the error vector check value e' obtained at 510 is compared with the error vector e obtained at 504 from the application of the decryption function. At 514, the confirmation check value $C_2'$ obtained at 508 is compared with the confirmation value $C_2$ obtained at 502. If the error vector check value e' is the same as (e.g., equal to) the error vector e and the confirmation check value $C_2'$ is the same as (e.g., equal to) the confirmation value $C_2$, then the encrypted message M' obtained at 502 is decrypted using the symmetric key K' obtained at 508. In some implementations, the encrypted message M' is decrypted according to a symmetric cipher system, such as, for example, an Advanced Encryption Standard (AES) cryptosystem.

If the error vector check value e' is the same as the error vector e or the confirmation check value $C_2'$ is not the same as the confirmation value $C_2$, then a failure is returned. In some implementations, returning a failure includes delivering an error message, a return code, a flag, or another type of indicator. The indicator may be sent back to the sender of the message in some instances. For example, in some implementations, a failure indicator may be sent back to the sender of the message. In some implementations, however, no indicator is sent to the sender of the message and the indicator is kept only with the recipient.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a key encapsulation mechanism is used in a communication network.

In a first example, an error vector derivation function (v(•)) is applied to a random value (s) to produce an error vector (e) and a plaintext value (x) is obtained based on the random value (s). The error vector (e) and the plaintext value (x) are used in an encryption function to produce a ciphertext ($C_1$), and a key derivation function (KDF) is applied to the random value (s) to produce a key derivation function output that includes a symmetric key (K) and a confirmation value ($C_2$). The symmetric key (K) is used to generate an encrypted message (M') based on an unencrypted message (M). The ciphertext ($C_1$), the confirmation value ($C_2$), and the encrypted message (M') are provided for transmission in a communication network.

Implementations of the first example may include one or more of the following features. The encryption function may include a McEliece encryption function, and using the error vector (e) in the encryption function may include using the error vector (e) and a public key (G) to encrypt the plaintext value (x) according to a McEliece cryptosystem. Applying the error vector derivation function (v(•)) to the random value (s) may include applying a pseudorandom function to the random value (s) to produce a pseudorandom function output, applying a filter to the pseudorandom function output to produce a filtered pseudorandom function output ($a_1, a_2, \ldots, a_n$) that has t integers, and generating the error vector (e) based on the filtered pseudorandom function output. The error vector (e) may have a Hamming weight equal to t. Respective positions of the nonzero elements of the error vector (e) may be indicated by the filtered pseudorandom function output.

Implementations of the first example may include one or more of the following features. Obtaining the plaintext value (x) based on the random value (s) may include assigning the random value (s) as the plaintext value (x). The key derivation function may be a first key derivation function, the key derivation function output may be a first key derivation function output, and obtaining the plaintext value (x) based on the random value (s) may include applying a second key derivation function to the error vector (e) to produce a second key derivation function output (y) and applying an exclusive-or function to the random value (s) and the second key derivation function output (y) to produce an exclusive-or function output (x). The exclusive-or function output (x) and the error vector (e) may be used in the encryption function to produce the ciphertext ($C_1$).

Implementations of the first example may include one or more of the following features. Applying the encryption function to the error vector may include adding the error vector to the product of the plaintext value and a public key matrix (c=xG+e). Applying the key derivation function to the random value (s) may include applying the key derivation function to a concatenation of the random value (s) and the error vector (e). The key derivation function output may include a concatenation of the symmetric key (K) and the confirmation value ($C_2$). The key derivation function may include a cryptographic hash function.

In a second example, a ciphertext ($C_1$) and an encrypted message (M') transmitted between nodes in a communication system are obtained. A decryption function is applied to the ciphertext ($C_1$) to produce a first decryption function output (x) and a second decryption function output (e), and a seed value (s') is obtained based on the first decryption function output (x). A key derivation function is applied to the seed value (s') to produce a key derivation function output, which includes a symmetric key (K'). An error vector derivation function (v(•)) is applied to the seed value (s') to produce an error vector check value (e'), and the second decryption function output (e) is compared with the error vector check value (e'). The symmetric key (K') is used to decrypt the encrypted message (M') in response a determination that the second decryption function output (e) is equal to the error vector check value (e').

Implementations of the second example may include one or more of the following features. The decryption function may include a McEliece decryption function, and applying the decryption function may include using a private key to decrypt the ciphertext according to a McEliece cryptosystem. The key derivation function output may include a confirmation check value ($C_2'$). A confirmation value ($C_2$) transmitted between the nodes in the communication system may be obtained, and the confirmation value ($C_2$) may be compared with the confirmation check value ($C_2'$). The symmetric key (K') may be used to decrypt the encrypted message (M') in response to a determination that the second decryption function output (e) is equal to the error vector check value (e') and a determination that the confirmation check value ($C_2'$) is equal to the confirmation value ($C_2$). Applying the key derivation function to the seed value (s') may include applying the key derivation function to a concatenation of the seed value (s') and the second decryption function output (e).

Implementations of the second example may include one or more of the following features. Obtaining the seed value (s') based on the first decryption function output (x) may include assigning the first decryption function output (x) as the seed value (s'). The key derivation function may be a first key derivation function, the key derivation function output may be a first key derivation function output, and obtaining the seed value (s') based on the first decryption function output (x) may include applying a second key derivation function to the error vector (e) to produce a second key derivation function output (y) and applying an exclusive-or function to the first decryption function output (x) and the second key derivation function output (y) to produce an exclusive-or function output (s').

Implementations of the second example may include one or more of the following features. Applying the decryption function to the ciphertext may include using a private key matrix associated with a public key matrix. Applying the error vector derivation function (v(•)) to the seed value (s') may include applying a pseudorandom function to the seed value (s') to produce a pseudorandom function output, applying a filter to the pseudorandom function output to produce a filtered pseudorandom function output ($a_1$, $a_2$, . . . , $a_n$), the filtered pseudorandom function output comprising t integers, and generating the error vector check value (e') based on the filtered pseudorandom function output. The error vector check value (e') may have a Hamming weight equal to t. Respective positions of the nonzero elements of the error vector check value (e') may be indicated by the filtered pseudorandom function output. The key derivation function output may include a concatenation of the symmetric key (K') and the confirmation check value ($C_2'$). The key derivation function may include a cryptographic hash function.

In some implementations, a computing system includes a data processing apparatus and a computer-readable medium storing instructions that are operable when executed by the data processing apparatus to perform one or more operations of the first example, the second example, or both. In some implementations, a computer-readable medium stores instructions that are operable when executed by a data processing apparatus to perform one or more operations of the first example, the second example, or both.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:
1. A key encapsulation method, comprising:
applying an error vector derivation function to a random value to produce an error vector, wherein applying the error vector derivation function to the random value comprises:
applying a pseudorandom function to the random value to produce a pseudorandom function output;
applying a filter to the pseudorandom function output to produce a filtered pseudorandom function output, the filtered pseudorandom function output comprising t integers; and
generating the error vector based on the filtered pseudorandom function output, the error vector having a Hamming weight equal to t;
obtaining a plaintext value based on the random value;
using the error vector and the plaintext value in an encryption function to produce a ciphertext;
applying a key derivation function to the random value to produce a key derivation function output, the key derivation function output comprising a symmetric key and a confirmation value;

by operation of one or more processors in a computer system, using the symmetric key to generate an encrypted message based on an unencrypted message; and providing the ciphertext, the confirmation value, and the encrypted message for transmission between nodes in a communication network.

2. The method of claim 1, wherein the encryption function comprises a McEliece encryption function, and using the error vector in the encryption function comprises using the error vector and a public key to encrypt the plaintext value according to a McEliece cryptosystem.

3. The method of claim 1, wherein respective positions of the nonzero elements of the error vector are indicated by the filtered pseudorandom function output.

4. The method of claim 1, wherein obtaining the plaintext value based on the random value comprises assigning the random value as the plaintext value.

5. The method of claim 1, wherein the key derivation function is a first key derivation function, the key derivation function output is a first key derivation function output, and the obtaining the plaintext value based on the random value comprises:
applying a second key derivation function to the error vector to produce a second key derivation function output; and
applying an exclusive-or function to the random value and the second key derivation function output to produce an exclusive-or function output;
wherein the exclusive-or function output and the error vector are used in the encryption function to produce the ciphertext.

6. The method of claim 1, wherein applying the encryption function to the error vector comprises adding the error vector to the product of the plaintext value and a public key matrix.

7. The method of claim 1, wherein applying the key derivation function to the random value comprises applying the key derivation function to a concatenation of the random value and the error vector.

8. The method of claim 1, wherein the key derivation function output comprises a concatenation of the symmetric key and the confirmation value.

9. The method of claim 1, wherein the key derivation function is a cryptographic hash function.

10. A computing system comprising:
a data processing apparatus; and
a non-transitory computer-readable medium storing instructions that are operable when executed by the data processing apparatus to perform operations comprising:
applying an error vector derivation function to a random value to produce an error vector, wherein applying the error vector derivation function to the random value comprises:
applying a pseudorandom function to the random value to produce a pseudorandom function output;
applying a filter to the pseudorandom function output to produce a filtered pseudorandom function output, the filtered pseudorandom function output comprising t integers; and
generating the error vector based on the filtered pseudorandom function output, the error vector having a Hamming weight equal to t;
obtaining a plaintext value based on the random value;
using the error vector and the plaintext value in an encryption function to produce a ciphertext;

applying a key derivation function to the random value to produce a key derivation function output, the key derivation function output comprising a symmetric key and a confirmation value;
using the symmetric key to generate an encrypted message based on an unencrypted message; and
providing the ciphertext, the confirmation value, and the encrypted message for transmission in a communication network.

11. The computing system of claim 10, wherein the encryption function comprises a McEliece encryption function, and using the error vector in the encryption function comprises using the error vector and a public key to encrypt the plaintext value according to a McEliece cryptosystem.

12. The computing system of claim 10, wherein
respective positions of the nonzero elements of the error vector are indicated by the filtered pseudorandom function output.

13. The computing system of claim 10, wherein obtaining the plaintext value based on the random value comprises assigning the random value as the plaintext value.

14. The computing system of claim 10, wherein the key derivation function is a first key derivation function, the key derivation function output is a first key derivation function output, and the obtaining the plaintext value based on the random value comprises:
applying a second key derivation function to the error vector to produce a second key derivation function output; and
applying an exclusive-or function to the random value and the second key derivation function output to produce an exclusive-or function output;
wherein the exclusive-or function output and the error vector are used in the encryption function to produce the ciphertext.

15. A key decapsulation method, comprising:
obtaining a ciphertext and an encrypted message transmitted between nodes in a communication system;
applying a decryption function to the ciphertext to produce a first decryption function output and a second decryption function output;
obtaining a seed value based on the first decryption function output;
applying a key derivation function to the seed value to produce a key derivation function output, the key derivation function output comprising a symmetric key;
applying an error vector derivation function to the seed value to produce an error vector check value, wherein applying the error vector derivation function to the seed value comprises:
applying a pseudorandom function to the seed value to produce a pseudorandom function output;
applying a filter to the pseudorandom function output to produce a filtered pseudorandom function output, the filtered pseudorandom function output comprising t integers; and
generating the error vector check value based on the filtered pseudorandom function output, the error vector check value having a Hamming weight equal to t;
comparing the second decryption function output with the error vector check value; and
by operation of one or more processors in a computer system, using the symmetric key to decrypt the encrypted message in response a determination that the second decryption function output is equal to the error vector check value.

16. The method of claim 15, wherein the decryption function comprises a McEliece decryption function, and applying the decryption function comprises using a private key to decrypt the ciphertext according to a McEliece cryptosystem.

17. The method of claim 15, wherein the key derivation function output comprises a confirmation check value, the method comprises obtaining a confirmation value transmitted between the nodes in the communication system and comparing the confirmation value with the confirmation check value, and the symmetric key is used to decrypt the encrypted message in response to a determination that the second decryption function output is equal to the error vector check value and a determination that the confirmation check value is equal to the confirmation value.

18. The method of claim 15, wherein applying the key derivation function to the seed value comprises applying the key derivation function to a concatenation of the seed value and the second decryption function output.

19. The method of claim 15, wherein obtaining the seed value based on the first decryption function output comprises assigning the first decryption function output as the seed value.

20. The method of claim 15, wherein the key derivation function is a first key derivation function, the key derivation function output is a first key derivation function output, and obtaining the seed value based on the first decryption function output comprises:
applying a second key derivation function to the error vector to produce a second key derivation function output; and
applying an exclusive-or function to the first decryption function output and the second key derivation function output to produce an exclusive-or function output.

21. The method of claim 15, wherein applying the decryption function to the ciphertext comprises using a private key matrix associated with a public key matrix.

22. The method of claim 15, wherein
respective positions of the nonzero elements of the error vector check value are indicated by the filtered pseudorandom function output.

23. The method of claim 15, wherein the key derivation function output comprises a concatenation of the symmetric key and the confirmation check value.

24. A computing system comprising:
a data processing apparatus; and
a non-transitory computer-readable medium storing instructions that are operable when executed by the data processing apparatus to perform operations comprising:
obtaining a ciphertext an encrypted message transmitted between nodes in a communication system;
applying a decryption function to the ciphertext to produce a first decryption function output and a second decryption function output;
obtaining a seed value based on the first decryption function output;
applying a key derivation function to the seed value to produce a key derivation function output, the key derivation function output comprising a symmetric key;
applying an error vector derivation function to the seed value to produce an error vector check value, wherein applying the error vector derivation function to the seed value comprises:
applying a pseudorandom function to the seed value to produce a pseudorandom function output;
applying a filter to the pseudorandom function output to produce a filtered pseudorandom function output, the filtered pseudorandom function output comprising t integers; and
generating the error vector check value based on the filtered pseudorandom function output, the error vector check value having a Hamming weight equal to t;
comparing the second decryption function output with the error vector check value; and
using the symmetric key to decrypt the encrypted message in response a determination that the second decryption function output is equal to the error vector check value.

25. The computing system of claim 24, wherein the decryption function comprises a McEliece decryption function, and applying the decryption function comprises using a private key to decrypt the ciphertext according to a McEliece cryptosystem.

26. The computing system of claim 24, wherein the key derivation function output comprises a confirmation check value, the operations comprise obtaining a confirmation value transmitted between the nodes in the communication system and comparing the confirmation value with the confirmation check value, and the symmetric key is used to decrypt the encrypted message in response to a determination that the second decryption function output is equal to the error vector check value and a determination that the confirmation check value is equal to the confirmation value.

27. The computing system of claim 24, wherein obtaining the seed value based on the first decryption function output comprises assigning the first decryption function output as the seed value.

28. The computing system of claim 24, wherein the key derivation function is a first key derivation function, the key derivation function output is a first key derivation function output, and obtaining the seed value based on the first decryption function output comprises:
applying a second key derivation function to the error vector to produce a second key derivation function output; and
applying an exclusive-or function to the first decryption function output and the second key derivation function output to produce an exclusive-or function output.

29. The computing system of claim 24, wherein
respective positions of the nonzero elements of the error vector check value are indicated by the filtered pseudorandom function output.

* * * * *